United States Patent
Gill et al.

(10) Patent No.: US 8,136,226 B2
(45) Date of Patent: Mar. 20, 2012

(54) READ SENSORS AND METHODS OF MAKING SAME WITH BACK-EDGE MILLING AND REFILLING

(75) Inventors: Hardayal S. Gill, Palo Alto, CA (US); Wipul P. Jayasekara, Los Gatos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 978 days.

(21) Appl. No.: 12/122,417

(22) Filed: May 16, 2008

(65) Prior Publication Data

US 2009/0286106 A1     Nov. 19, 2009

(51) Int. Cl.
   *G11B 5/39*        (2006.01)
   *G11B 5/127*     (2006.01)

(52) U.S. Cl. ..................... 29/603.13; 360/319

(58) Field of Classification Search .................. 360/319, 360/125.1, 125.09, 125.07, 125.11, 121, 360/125.14, 125.08; 29/603.12, 603.08, 29/603.13, 603.14, 603.01; 428/811.2; 427/128

See application file for complete search history.

(56) References Cited

U.S. PATENT DOCUMENTS

| | | | |
|---|---|---|---|
| 6,683,749 B2 | 1/2004 | Daby et al. | |
| 7,094,130 B2 | 8/2006 | Cyrille et al. | |
| 7,102,854 B2 * | 9/2006 | Wang et al. | 360/125.5 |
| 7,149,045 B1 * | 12/2006 | Mallary et al. | 360/55 |
| 7,237,321 B2 | 7/2007 | Cyrille et al. | |
| 7,461,933 B2 * | 12/2008 | Deily et al. | 347/102 |
| 7,486,475 B2 * | 2/2009 | Biskeborn | 360/121 |
| 7,679,862 B2 * | 3/2010 | Nakamoto et al. | 360/125.32 |
| 7,810,226 B2 * | 10/2010 | Hirabayashi et al. | 29/603.12 |
| 7,944,646 B2 * | 5/2011 | Mochizuki et al. | 360/125.1 |
| 2005/0266357 A1 | 12/2005 | Baer et al. | |
| 2007/0030592 A1 | 2/2007 | Shintani et al. | |
| 2007/0048624 A1 | 3/2007 | Chen et al. | |
| 2007/0206333 A1 | 9/2007 | Watanabe et al. | |

* cited by examiner

*Primary Examiner* — Allen Cao
(74) *Attorney, Agent, or Firm* — Patterson & Sheridan, LLP

(57) ABSTRACT

Methods and apparatus provide a refill configuration adjacent a back-edge that defines a height of a magnetoresistive read sensor. Milling through layers of the sensor forms the back-edge and may be initially conducted at a first angle of incidence greater than a second angle of incidence. In combination, an insulating material and a polish resistant material, such as a non-magnetic metal, disposed on the insulating material fills a void created by the milling. The sensor further includes first and second magnetic shields with the layers of the sensor along with the polish resistant material and insulating material disposed between the first and second magnetic shields.

14 Claims, 5 Drawing Sheets

READ SENSORS AND METHODS OF MAKING SAME WITH BACK-EDGE MILLING AND REFILLING

BACKGROUND OF THE INVENTION

1. Field of the Invention

Embodiments of the invention generally relate to magnetoresistive reader structures for sensing data stored on magnetic media and methods of making the structures.

2. Description of the Related Art

In an electronic data storage and retrieval system, a magnetic head typically includes a reader portion having a magnetoresistive (MR) sensor for retrieving magnetically encoded information stored on a magnetic recording medium or disk. The MR sensor includes multiple layers and operates based on a change of resistance of the MR sensor in the presence of a magnetic field. During a read operation, a bias current is passed through the MR sensor. Magnetic flux emanating from a surface of the recording medium causes rotation of a magnetization vector of a sensing or free layer of the MR sensor, which in turn causes the change in resistance of the MR sensor. The change in resistance of the read element is detected by passing a sense current through the read element, and then measuring the change in bias voltage across the read element to generate a read signal. This signal can then be converted and manipulated by an external circuitry as necessary.

A hard magnetic bias structure can be used to stabilize the magnetic movement of the free layer to provide a noise-free response from the MR sensor. In construction of the MR sensor, milling at parallel sides of the layers making up the MR sensor and depositing hard bias layers on both milled sides of the MR sensor accomplishes this stabilization. Further, the milling at both sides defines a track width, while milling through the layers at a back-edge prior to refilling defines a height of the MR sensor relative to an air bearing surface opposite the back-edge.

Prior approaches for defining the height of the MR sensor exist but have disadvantages. Damage at the back-edge of the MR sensor can prevent proper magnetic performance of the MR sensor. Further, shunting around a barrier layer of the MR sensor between the free layer and a pinned layer of the MR sensor can occur at the back edge, thereby introducing noise in the read signal.

Therefore, there exists a need for processes of fabricating magnetoresistive sensors to improve properties of the sensors.

SUMMARY OF THE INVENTION

In one embodiment, a method of forming a magnetoresistive (MR) read sensor includes removing a portion of a MR sensor stack on a first magnetic shield to form a back-edge of the MR sensor stack. The back-edge defines a height of the MR sensor stack in a direction perpendicular to a track width direction. The method further includes depositing an insulating layer on the back-edge of the MR sensor stack, depositing a non-magnetic polish resistant layer on the insulating layer, and depositing a second magnetic shield over the MR sensor stack and the polish resistant layer.

For one embodiment, a MR read sensor includes a MR sensor stack having a back-edge that defines a height of the MR sensor stack in a direction perpendicular to a track width direction. The sensor includes an insulating layer disposed on the back-edge of the MR sensor stack and a non-magnetic polish resistant layer disposed on the insulating layer. First and second magnetic shields form part of the sensor with the MR sensor stack and the polish resistant layer disposed between the shields.

According to one embodiment, a method of forming a MR read sensor includes initially milling at a first angle a portion of a MR sensor stack disposed on a first magnetic shield. Further milling the portion of the MR sensor stack at a second angle smaller than the first angle forms a back-edge of the MR sensor stack and removes part of the first magnetic shield. In addition, the method includes depositing an insulating layer on the back-edge of the MR sensor stack to partially fill a void created by the milling, and depositing a metallic non-magnetic layer on the insulating layer to complete filling of the void. The metallic non-magnetic layer provides a slower polishing rate than the insulating layer. Depositing a second magnetic shield over the MR sensor stack and the polish resistant layer completes the read sensor.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Embodiments of the invention relate to a refill configuration adjacent a back-edge that defines a height of a magnetoresistive read sensor. Milling through layers of the sensor forms the back-edge and may be initially conducted at a first angle of incidence greater than a second angle of incidence. In combination, an insulating material and a polish resistant material, such as a non-magnetic metal, disposed on the insulating material fills a void created by the milling. The sensor further includes first and second magnetic shields with the layers of the sensor along with the polish resistant material and insulating material disposed between the first and second magnetic shields.

Figure 1:
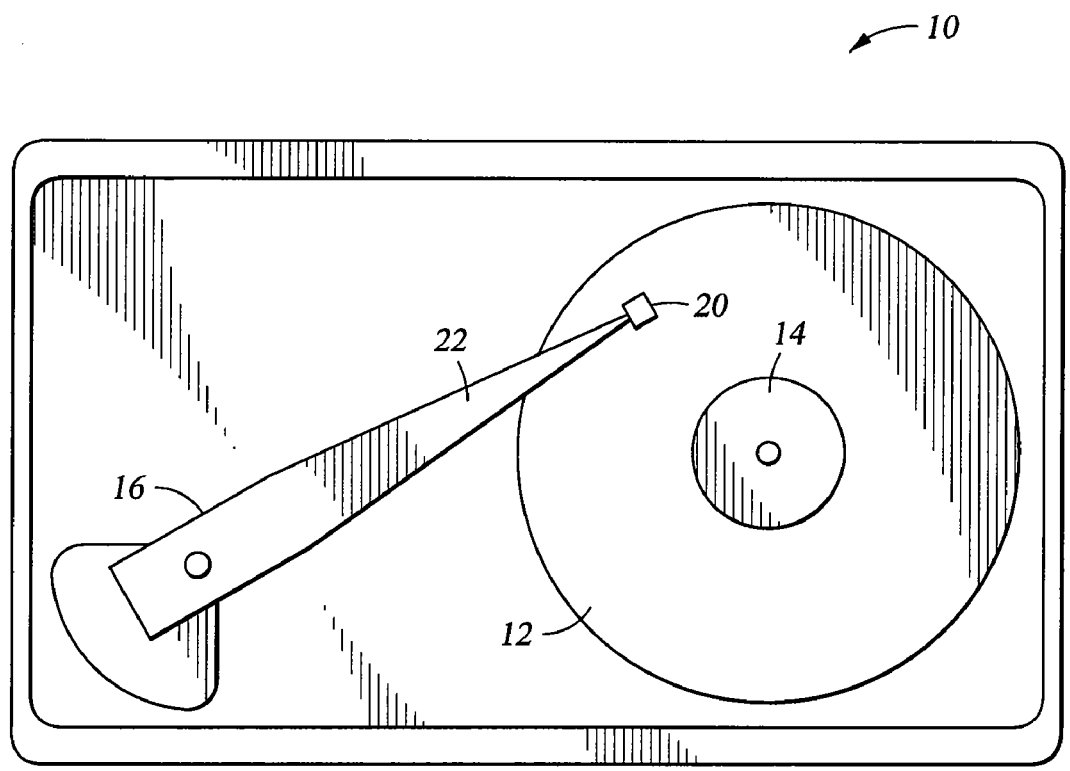
FIG. 1 is a top plan view of a hard disk drive including a magnetic head, according to embodiments of the invention.

FIG. 1 illustrates a hard disk drive 10 that includes a magnetic media hard disk 12 mounted upon a motorized spindle 14. An actuator arm 16 is pivotally mounted within the hard disk drive 10 with a magnetic head 20 disposed upon a distal end 22 of the actuator arm 16. During operation of the hard disk drive 10, the hard disk 12 rotates upon the spindle 14 and the magnetic head 20 acts as an air bearing slider adapted for flying above the surface of the disk 12. As described hereinafter, the magnetic head 20 includes a substrate base upon which various layers and structures that form the magnetic head 20 are fabricated. Thus, magnetic heads disclosed herein can be fabricated in large quantities upon a substrate and subsequently sliced into discrete magnetic heads for use in devices such as the hard drive 10.

Figure 6:
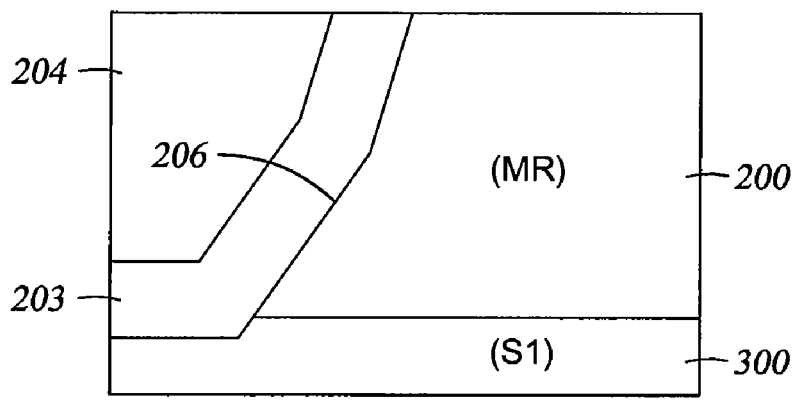
FIG. 6 is a cross-sectional diagrammatic view of the structure subsequent to chemical mechanical polishing and lifting off of a mask, according to embodiments of the invention.
Figure 7:
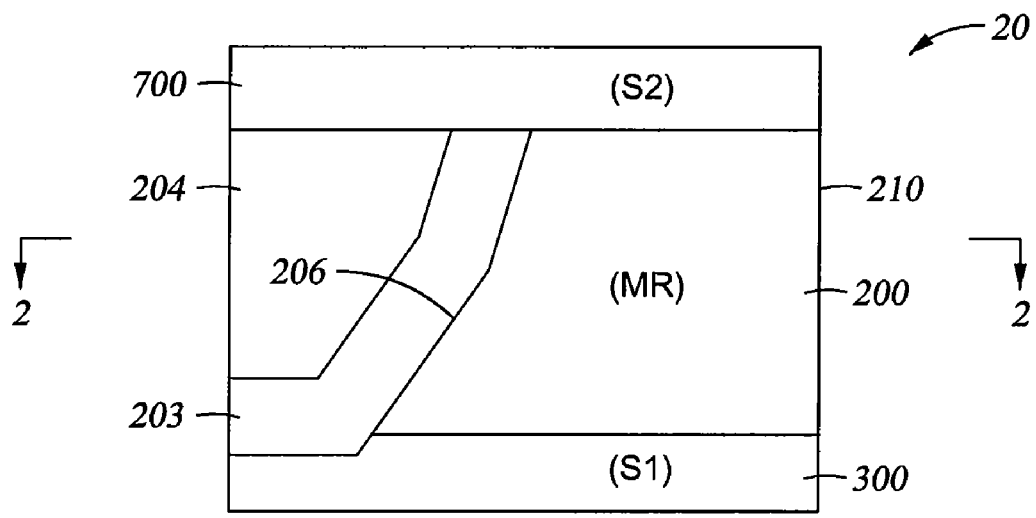
FIG. 7 is a cross-sectional diagrammatic view after deposition of a second shield, according to embodiments of the invention.

A read portion of the magnetic head 20 includes a read sensor between magnetic bottom (S1) and top (S2) shields 300, 700 (both shown in FIG. 7). For some embodiments, the read sensor is a giant magnetoresistive (GMR) sensor or a tunnel magnetoresistive (TMR) sensor, is a current-perpendicular-to-plane (CPP) type and has a plurality of magnetic and nonmagnetic layers (hereinafter "MR element stack" depicted schematically by reference number 200 in FIGS. 2-7). A magnetic hard bias layer 202 (shown in FIG. 2) of the read sensor provides a longitudinal magnetic bias to align a ferromagnetic free layer of the MR element stack 200 in a single domain state. The following describes in detail methods of producing this read sensor of the magnetic head 20.

Figure 2:
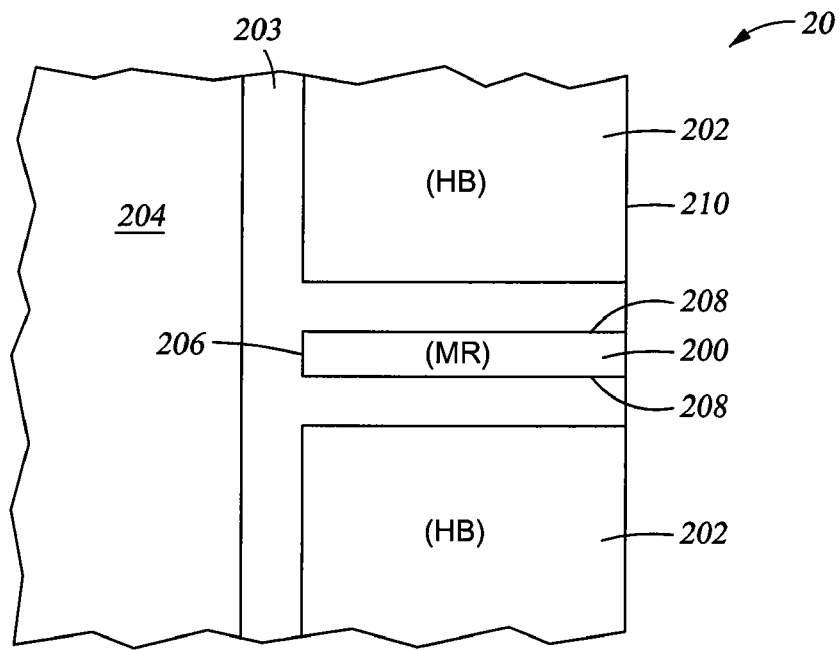
FIG. 2 is a cross-sectional diagrammatic view of a read element of the magnetic head taken across line 2-2 of FIG. 7, according to embodiments of the invention.

FIG. 2 shows a cross-sectional diagrammatic view of the magnetic head 20. The magnetic head 20 includes the MR element stack 200 (MR), the hard bias layer 202 (HB) and an insulating layer 203 preventing electrical shorting to the MR element stack 200. The insulating layer 203 isolates a back-edge 206 of the MR element stack 200 from a non-magnetic polish resistant layer 204. In addition, the insulating layer 203 separates the MR element stack 200 from the hard bias layer 202 disposed along both lateral sides 208 of the MR element stack 200. The back-edge 206 and the lateral sides 208 transect planes corresponding to layers within the MR element stack 200. The back-edge 206 defines a height of the MR element stack 200 relative to an opposite side of the MR element stack 200 at an air bearing surface (ABS) 210, which is spaced from the back-edge 206 of the MR element stack 200. The lateral sides 208 extend between the ABS 210 and the back-edge 206 of the MR element stack 200 and are separated from one another to define a track-width of the MR element stack 200.

Figure 3:
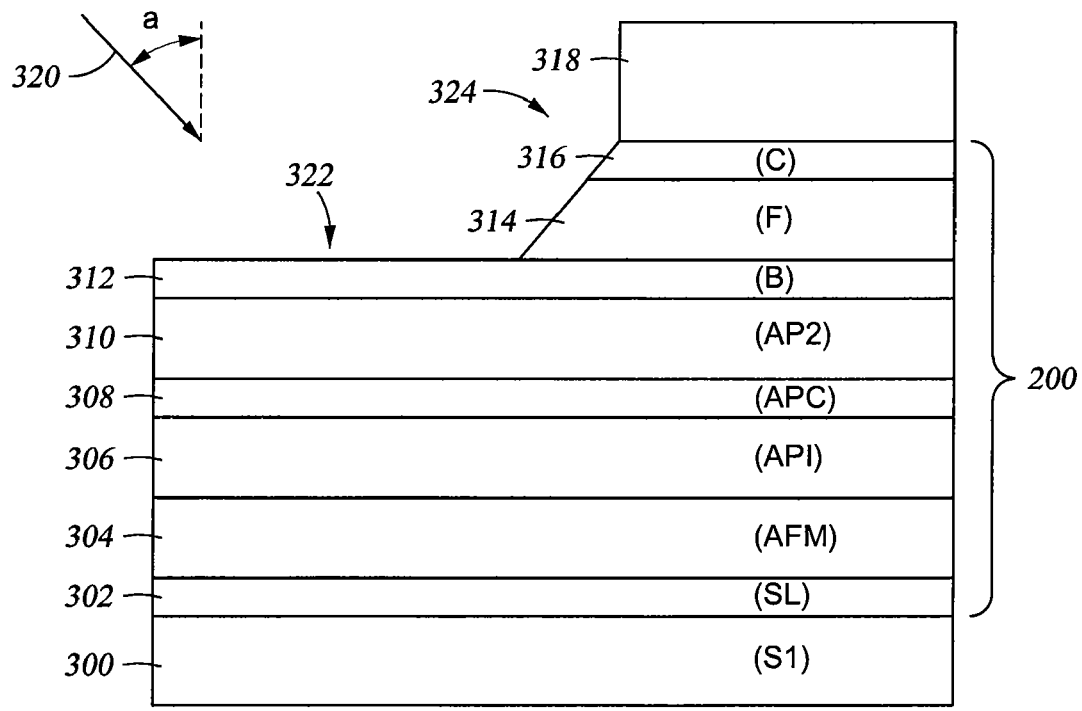
FIG. 3 is a cross-sectional diagrammatic illustration of a partially completed structure, which when finished forms the read element viewed across a horizontal mid-line of FIG. 2, post initial milling at a back-edge of a sensor stack, according to embodiments of the invention.

FIG. 3 illustrates a cross-sectional diagram of a partially completed structure, which when finished forms the read element of the magnetic head 20 viewed across a horizontal mid-line of FIG. 2. Exemplary layers of the MR element stack 200 deposited on the first shield 300, include in order a seed layer 302 (SL), an antiferromagnetic layer 304 (AFM), a first pinning layer 306 (AP1), an antiparallel coupling layer 308 (APC), a second pinning layer 310 (AP2), a barrier layer 312 (B), a free layer 314 (F), and a capping layer 316 (C). Other configurations may provide the MR element stack 200, which is not limited to any particular arrangement shown. A patterned mask 318 on the MR element stack 200 selectively protects part of the MR element stack 200 from initial milling (depicted by arrow 320) in a process to form the back-edge 206 of the MR element stack 200. For some embodiments, the initial milling 320 occurs at a first angle (a) relative to normal from the plane of the layers within the MR element stack 200. The first angle may be between 35° and 65°, greater than 45°, or about 50°, for example. The initial milling 320 progresses until reaching the barrier layer 312 in a field area 322 while only partially milling the cap layer 316 at a junction edge 324. The field area 322 refers to where milling is substantially parallel to the plane of the layers within the MR element stack 200, while the junction edge 324 refers to where tapered milling due to the milling angle transitions toward perpendicular to the plane of the layers within the MR element stack 200.

Figure 4:
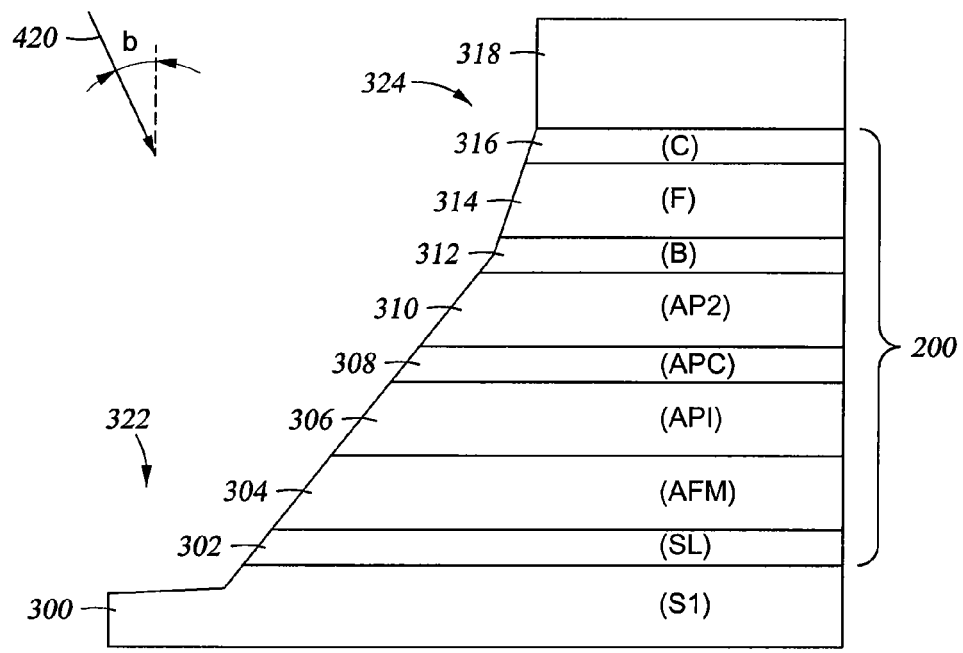
FIG. 4 is a cross-sectional diagrammatic view of the structure following further milling until reaching a first shield at the back-edge of the sensor stack to define a height of the sensor stack, according to embodiments of the invention.

FIG. 4 illustrates the structure following further milling 420 to complete formation of the back-edge 206 of the MR element stack 200 and thereby define a height of the MR element stack 200. In some embodiments, the further milling 420 occurs at a second angle (b) that is smaller than the first angle and that may be between 20° and 40°, or about 30°. The further milling removes all the MR element stack 200 in the field area 322 and over-mills (e.g., 10 nanometers (nm)) into the first shield 300 at the field area 322. The further milling conducted at the second angle defines the free layer 314 at the junction edge 324 without going all the way through the barrier layer 312 at the junction edge 324. This arrangement of the free layer 314 and the barrier layer 312 facilitates prevention of current shunting around the barrier layer 312 at the back edge 206 of the MR element stack 200. Further, the pinned layers 306, 310 remain longer in the height to ensure proper magnetic performance of the free layer 314.

The milling angles (a, b) limit amount of material deposited back during the milling. Such redeposit can result in damage to edges of the MR element stack 200. For example, magnetic material deposited at random on the back-edge 206 of the MR element stack 200 can alter response performance of the free layer 314. A corresponding milling procedure with analogous angles may form the lateral sides 208 of the MR element stack 200 prior to deposition of the hard bias layer 202. While specific milling procedures are disclosed, embodiments may utilize other milling techniques to remove part of the MR element stack 200 to form its back-edge 206 prior to refilling as described herein.

Figure 5:
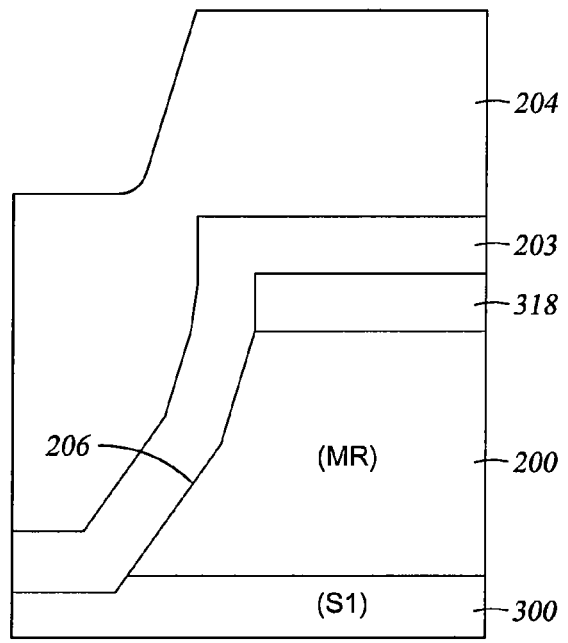
FIG. 5 is a cross-sectional diagrammatic view of the structure upon depositing an insulation layer and then a non-magnetic polish resistant layer within a void created by the milling, according to embodiments of the invention.

FIG. 5 shows the structure (the MR element stack 200 depicted as a block without delineation of individual layers) in cross-section upon depositing the insulation layer 203 and then the non-magnetic polish resistant layer 204 within a void created by the milling. For some embodiments, the insulation layer 203 includes alumina ($Al_2O_3$) deposited by atomic layer deposition. The atomic layer deposition deposits a uniform thickness of the insulation layer 203 on the back-side 206 of the MR element stack 200 and the first shield 300 where exposed by the milling. The thickness of the insulation layer 203 may, for example, be greater than 5 nm, greater than 10 nm, or range from about 5 to about 10 nm, which may be less thick than the polish resistant layer 204 and is less thick than the MR element stack 200.

A material that polishes at a slower rate than the insulation layer 203 forms the polish resistant layer 204. For some embodiments, a non-magnetic metallic material, such as rhodium (Rh), chromium (Cr), tantalum (Ta), tungsten (W), zirconium (Zr) and combinations thereof as either alloys or separate sub-layers, forms the polish resistant layer 204. The polish resistant layer 204 fills the void caused by milling to at least make the polish resistant layer 204 level with the MR element stack 200.

The slower polishing rate of the polish resistant layer 204 protects the insulation layer 203 from erosion and/or chemical attack during subsequent processing of the structure. Such unwanted loss or harm of the insulation layer 203 against the MR element stack 200 can thereby lead to damage and/or exposure at the back-edge 206 of the MR element stack 200. Refilling the void at the back-edge 206 of the MR element stack 200 can result in a bumpy topography at the junction due to milling angles. This bumpy topography occurs when only alumina is used to refill the void and can contribute to damage at the back-edge 206 of the MR element stack 200 during subsequent polishing. In addition to providing protection as a result of the slower polishing rate, the deposition of the polish resistant layer 204 tends to produce a uniform surface profile extending away from the MR element stack 200. If the back-edge 206 is formed prior to the side edges 208, the polish resistant layer 204 also protects the back-edge 206 of the MR element stack 200 during the subsequent processing to form the side edges 208.

FIG. 6 illustrates the structure subsequent to lifting off of the mask 318 and chemical mechanical polishing (CMP). While material is removed from on the MR element stack 200 where no milling occurred, the polish resistant layer 204 remains following the CMP to provide part of refill at the back-edge 206 of the MR element stack 200. Thickness of the polish resistant layer 204 that remains may range from 20-30 nm, for example. The thickness of the polish resistant layer 204 depends on thickness of the insulation layer 203, thickness of the MR element stack 200, and amount of over-mill into the first shield 300. An exposed face includes surfaces of the MR element stack 200, the insulation layer 203, and the polish resistant layer 204.

FIG. 7 shows the structure after deposition of the second shield 700, which may include one or more seed layers and plated material. Since the polish resistant layer 204 is not completely removed prior to deposition of the second shield 700, the second shield 700 extends over the MR element stack 200 and the polish resistant layer 204 proximate the back-edge 206 of the MR element stack 200. Magnetic domains in the second shield 700 can cause problems with performance of the MR element stack 200. Due to benefits provided by the polish resistant layer 204 as described herein, flatness of the face formed by surfaces of the MR element stack 200, the insulation layer 203, and the polish resistant layer 204 ensures prevention of these magnetic domains within the second shield 700.

Figure 8:
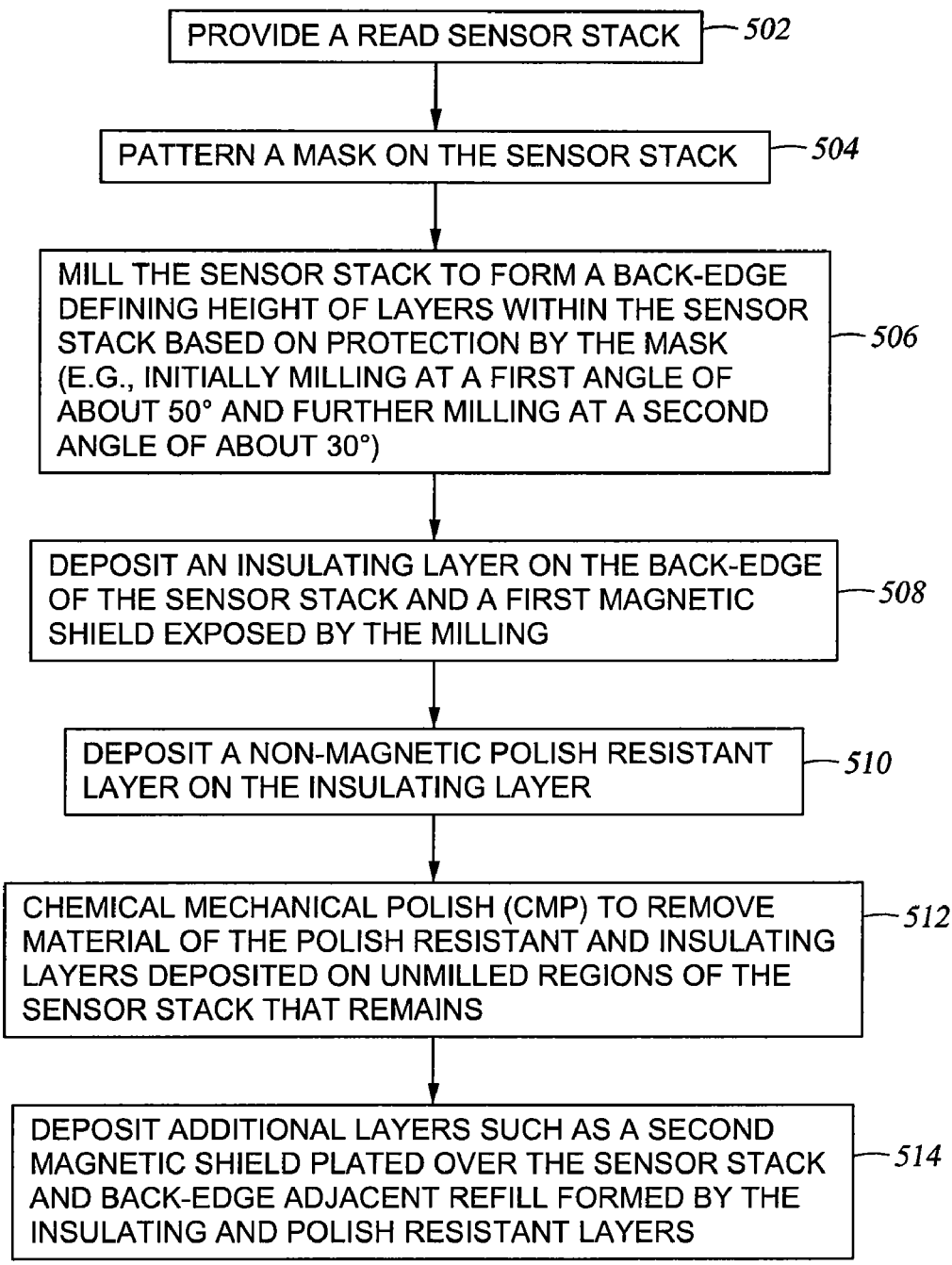
FIG. 8 is a flow chart illustrating a method of making the structure depicted in FIGS. 3-7, according to embodiments of the invention.

FIG. 8 provides a flow chart for a method of making the structure depicted in FIGS. 3-7. The method includes providing a read sensor stack (step 502) and patterning a mask (step 504) on the read sensor stack. Ion milling (step 506) the read sensor stack removes part of the read sensor stack where unprotected by the mask to form a back-edge defining a sensor height. This removal of material to form the back-edge may include conducting the milling at different angles, such as about 50° and then about 30°.

Next, depositing an insulating layer (step 508) coats the back-edge of the sensor stack and a first magnetic shield exposed by the milling. Depositing a polish resistant layer (510) on the insulating layer fills in where the milling left a void. Subsequently, chemical mechanical polishing (step 512) and/or lift off of the mask removes deposited material from regions of the sensor stack that were not milled. Plating of a second shield (step 514) over the sensor stack and back-edge adjacent refill formed by the insulating and polish resistant layers completes the structure.

While the foregoing is directed to embodiments of the present invention, other and further embodiments of the invention may be devised without departing from the basic scope thereof, and the scope thereof is determined by the claims that follow.

What is claimed is:

1. A method of forming a magnetoresistive (MR) read sensor, comprising:
providing a MR sensor stack on a first magnetic shield;
removing a portion of the MR sensor stack to form a back-edge of the MR sensor stack, wherein the back-edge defines a height of the MR sensor stack in a direction perpendicular to a track width direction;
depositing an insulating layer on the back-edge of the MR sensor stack;
depositing a non-magnetic polish resistant layer on the insulating layer, wherein the non-magnetic polish resistant layer has a slower polishing rate than the insulating layer; and
depositing a second magnetic shield over the MR sensor stack and the polish resistant layer.

2. The method of claim 1, further comprising chemical mechanical polishing to remove material of the polish resistant and insulating layers deposited on the MR sensor stack.

3. The method of claim 1, wherein the non-magnetic polish resistant layer is a metal.

4. The method of claim 1, wherein the non-magnetic polish resistant layer is selected from one of chromium, rhodium, tantalum, tungsten, and zirconium.

5. The method of claim 1, wherein removing the portion of the MR sensor comprises milling at a first angle and then milling at a second angle smaller than the first angle.

6. The method of claim 1, wherein removing the portion of the MR sensor comprises milling at a first angle of 50° and then milling at a second angle of 30°.

7. The method of claim 1, wherein removing the portion of the MR sensor comprises milling to a barrier layer at a first angle and then milling, at a second angle smaller than the first angle, to a first magnetic shield.

8. The method of claim 1, wherein the insulating layer comprises alumina.

9. The method of claim 1, wherein depositing the insulating layer forms a layer of alumina that is greater than 10 nanometers thick.

10. The method of claim 1, wherein depositing the insulating layer occurs by atomic layer deposition.

11. A method of forming a magnetoresistive (MR) read sensor, comprising:
providing a MR sensor stack disposed on a first magnetic shield;

initially milling a portion of the MR sensor stack at a first angle;

further milling the portion of the MR sensor stack at a second angle smaller than the first angle to form a back-edge of the MR sensor stack, wherein the further milling removes part of the first magnetic shield;

depositing an insulating layer on the back-edge of the MR sensor stack to partially fill a void created by the milling;

depositing a metallic non-magnetic layer on the insulating layer to complete filling of the void, wherein the metallic non-magnetic layer has a slower polishing rate than the insulating layer; and depositing a second magnetic shield over the MR sensor stack and the polish resistant layer.

12. The method of claim 11, wherein the further milling commences once the initial milling is stopped upon reaching a barrier layer of the MR sensor stack.

13. The method of claim 11, wherein the first angle is about 50° and the second angle is about 30°.

14. The method of claim 11, wherein the non-magnetic polish resistant layer is selected from at least one of chromium, rhodium, tantalum, tungsten, and zirconium.

* * * * *